United States Patent
Slayton et al.

(10) Patent No.: US 10,704,676 B2
(45) Date of Patent: Jul. 7, 2020

(54) SYSTEM AND METHOD OF CHARGING A TRANSMISSION ACCUMULATOR

(71) Applicant: Ford Global Technologies, LLC, Dearborn, MI (US)

(72) Inventors: Joseph Scott Slayton, Macomb Township, MI (US); Patrick Heikka, Troy, MI (US); Mark Davis, Plymouth, MI (US); Hafiz Shafeek Khafagy, Dearborn, MI (US); Benjamin Rupley, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 16/049,229

(22) Filed: Jul. 30, 2018

(65) Prior Publication Data
US 2020/0032897 A1    Jan. 30, 2020

(51) Int. Cl.
*F16H 61/00*    (2006.01)
*F15B 1/033*    (2006.01)
(Continued)

(52) U.S. Cl.
CPC ......... *F16H 61/0021* (2013.01); *F15B 1/033* (2013.01); *F15B 2211/212* (2013.01); *F15B 2211/30505* (2013.01); *F15B 2211/40584* (2013.01); *F15B 2211/6309* (2013.01); *F16H 59/44* (2013.01); *F16H 2059/446* (2013.01); (Continued)

(58) Field of Classification Search
CPC ............ F16H 61/0021; F16H 61/0025; F16H 2061/0034; F16H 59/44; F16H 2059/446; F16H 2059/683; F16H 63/3483; F16D 2048/0293; F16D 48/066; F16D 48/10; F15B 1/033; F15B 2211/212;
(Continued)

(56) References Cited

U.S. PATENT DOCUMENTS 8,639,424 B2    1/2014    Lundberg et al.
8,702,562 B2    4/2014    Zhang et al.
(Continued)

FOREIGN PATENT DOCUMENTS

WO    2015175262 A1    11/2015

*Primary Examiner* — Jacob S. Scott
*Assistant Examiner* — Lori Wu
(74) *Attorney, Agent, or Firm* — Vincent Mastrogiacomo; Brooks Kushman P.C.

(57) ABSTRACT

A transmission assembly including a clutch system, an accumulator, and a controller is provided. The clutch system may include a flow source. The accumulator may be selectively in communication with the flow source via a solenoid valve. The controller may be programmed to, responsive to detection of a vehicle stop and the accumulator charged below a predetermined threshold, output a command to open the solenoid valve to rapidly charge the accumulator from the flow source. The predetermined threshold may be an accumulator pressure between 700 kPa and 900 kPa. The controller may be further programmed to, responsive to detection of the accumulator being charged to or above the predetermined threshold, output a shut down command to an engine in communication with the transmission assembly and to output a close command to the solenoid valve. The flow source may be a pump out circuit or a line pressure circuit.

18 Claims, 4 Drawing Sheets

(51) Int. Cl.
*F16H 59/68* (2006.01)
*F16H 59/44* (2006.01)

(52) U.S. Cl.
CPC .............. *F16H 2059/683* (2013.01); *F16H 2061/0034* (2013.01)

(58) Field of Classification Search
CPC .... F15B 2211/6309; F15B 2211/30505; F15B 2211/40584
See application file for complete search history.

(56) References Cited

U.S. PATENT DOCUMENTS

| | | | |
|---|---|---|---|
| 8,915,074 B2 | 12/2014 | Otanez et al. | |
| 9,163,720 B2 | 10/2015 | Eber | |
| 9,771,853 B2 | 9/2017 | Benoit | |
| 2013/0232962 A1 | 9/2013 | Marin et al. | |
| 2013/0264164 A1* | 10/2013 | Otanez | F16H 61/0031 192/3.3 |
| 2014/0163845 A1 | 6/2014 | Otanez et al. | |
| 2016/0131164 A1* | 5/2016 | Carpenter | F15B 19/005 92/5 R |
| 2018/0306314 A1* | 10/2018 | Devendran | F16H 61/0031 192/3.3 |

\* cited by examiner

SYSTEM AND METHOD OF CHARGING A
TRANSMISSION ACCUMULATOR

TECHNICAL FIELD

This disclosure relates to the field of hydraulic control systems for automatic transmissions for motor vehicles. More particularly, the disclosure relates to a transmission assembly including an accumulator and a solenoid valve.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high-speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Discrete ratio transmissions are capable of transmitting power via various power flow paths, each associated with a different speed ratio. A particular power flow path is established by engaging particular shift elements, such as clutches or brakes. Shifting from one gear ratio to another involves changing which shift elements are engaged. In many transmissions, the torque capacity of each shift element is controlled by routing fluid to the shift elements at a controlled pressure. A controller adjusts the pressure by sending electrical signals to a valve body.

To save fuel, some vehicles include stop/start programming to automatically shut off the engine when the vehicle is stopped while in Drive, such as while waiting at a red traffic light. The engine is then automatically started when the driver lifts his or her foot off the brake pedal. It is important that the vehicle begin accelerating as soon as the driver presses the accelerator pedal. To accomplish that, it may be necessary to keep one or more shift elements engaged. Since an engine driven pump does not provide pressurized fluid when the engine is off, a different source of pressurized fluid may be included, such as an accumulator.

During various types of driving, it is possible to request a stop/start event when the accumulator is not adequately filled. For example, during city driving it is possible to have repeated stop/start requests without increasing engine speed or driver demand enough to raise a line pressure high enough to fully charge the accumulator. This scenario may generate inconsistent restart engagement times and inconsistent engagement feel since the accumulator is not adequately filled.

SUMMARY OF THE DISCLOSURE

A transmission assembly includes a clutch system, an accumulator, and a controller. The clutch system includes a flow source. The accumulator is selectively in communication with the flow source via a solenoid valve. The controller is programmed to, responsive to detection of a vehicle stop and the accumulator charged below a predetermined threshold, output a command to open the solenoid valve to rapidly charge the accumulator from the flow source. The predetermined threshold may be an accumulator pressure between 700 kPa and 900 kPa. The controller may be further programmed to, responsive to detection of the accumulator being charged to or above the predetermined threshold, output a shut down command to an engine in communication with the transmission assembly and to output a close command to the solenoid valve. The flow source may be a pump out circuit or a line pressure circuit. The assembly may include a check valve in fluid communication with the flow source and oriented in parallel to the solenoid valve. The check valve may be arranged with the accumulator to passively allow fluid to travel therethrough and fill the accumulator. The check valve may be further arranged with the accumulator to identify a flow rate of fluid traveling through the check valve. The controller may be further programmed to identify a pressure level of the accumulator based on the identified flow rate. The controller may be further programmed to output the command to open the solenoid valve to rapidly charge the accumulator responsive to detection of the clutch system maintaining a gear shift position during the vehicle stop.

A transmission assembly includes a clutch system, an accumulator, a check valve, and a controller. The clutch system includes a line pressure circuit. The accumulator is selectively in communication with the line pressure circuit via a solenoid valve configured to selectively open and close to discharge and fill the accumulator. The check valve is in passive fluid communication with the line pressure circuit and arranged in parallel to the solenoid valve. The controller is programmed to, responsive to detection of a vehicle stop, the accumulator charged below a predetermined threshold, and a transmission maintaining a gear shift position, output a command to open the solenoid valve to rapidly charge the accumulator from the line pressure circuit, then output a command to increase a pressure within the line pressure circuit, and then output a command to close the solenoid valve upon detection of the accumulator being charged to the predetermined threshold. The controller may be further programmed to output a command to shut down an engine after the solenoid valve is closed. The predetermined threshold may be an accumulator pressure between 700 kPa and 900 kPa. The check valve may be further arranged with the accumulator to identify a flow rate of fluid traveling through the check valve. The controller may be further programmed to identify a pressure level of the accumulator based on the identified flow rate. The assembly may further include a sensor in communication with the controller and arranged with the accumulator to identify a charge level of the accumulator. The transmission maintaining a gear shift position may be reflective of vehicle conditions of the vehicle stop. The controller may be further programmed to output a command to discharge the accumulator responsive to detection of a command to crank an engine during a restart operation of a stop/start program such that fluid from the accumulator fills the line pressure circuit and clutches of the clutch system.

A method of charging a transmission accumulator includes, responsive to detection of a vehicle stop condition and an accumulator pressure level below a predetermined pressure threshold, outputting, via a controller, an activation command to open a solenoid valve in fluid communication with an accumulator and a flow source and a flow source pressure increase command such that fluid may flow into the accumulator via the solenoid valve for filling at least to the predetermined pressure threshold and such that stop/start programming may operate. The predetermined pressure threshold may be a pressure between 700 kPa and 900 kPa. The method may further include outputting a command, via the controller, to discharge the accumulator responsive to detection of a command to crank an engine during a restart operation of a stop/start program such that fluid from the accumulator fills the flow source and clutches of a clutch system. Output of the activation command may further be responsive to detection of a transmission maintaining a gear shift position during the vehicle stop condition. The method may further include orienting a check valve in fluid communication with the flow source in parallel to the solenoid valve. The detecting whether the accumulator is at or above a predetermined pressure threshold may further include one of (i) the controller identifying an accumulator pressure level based on a fluid flow rate of fluid traveling through the check valve, or (ii) the controller identifying the accumulator pressure level based on information received from a sensor of the accumulator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
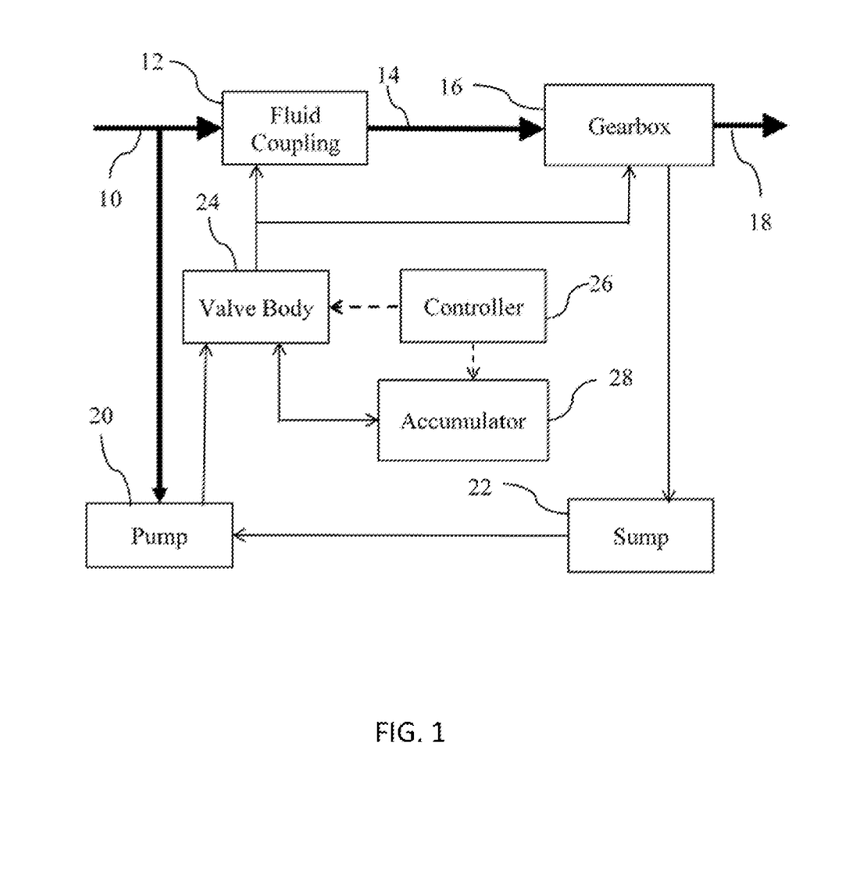
FIG. 1 is a schematic diagram illustrating an example of a transmission system.

FIG. 1 is a schematic diagram illustrating an example of a vehicle transmission assembly. Bold solid lines represent mechanical power flow connections. Thin solid lines represent a flow of hydraulic fluid. Dashed lines represent a flow of information signals. Power is supplied at an input shaft 10, generally from a crankshaft of an internal combustion engine. A fluid coupling 12 includes an impeller driveably connected to the input shaft 10 and a turbine driveably connected to a turbine shaft 14. Power is transmitted from the impeller to the turbine via moving fluid whenever the impeller rotates faster than the turbine. The fluid coupling 12 may be a torque converter which also includes a stator to redirect the fluid when the impeller is rotating substantially faster than the turbine such that turbine torque is a multiple of impeller torque. A gearbox 16 includes gearing and shift elements configured to establish various power flow paths between the turbine shaft 14 and an output shaft 18. Each power flow path may be established by engaging a specified subset of the shift elements. At low vehicle speed, a power flow path providing torque multiplication and speed reduction between the turbine shaft 14 and the output shaft 18 may be established to optimize vehicle performance. At higher vehicle speeds, a power flow path providing speed multiplication may be established to minimize fuel consumption.

Most of the shift elements within the gearbox 16 are engaged by supplying hydraulic fluid at an elevated pressure to a clutch apply chamber described further herein. (The gearbox 16 may also include passively engaged one-way clutches or electrically actuated elements.) Each shift element may include a clutch pack having friction plates splined to one component interleaved with separator plates splined to a different component. The pressurized fluid forces a piston to squeeze the clutch pack such that frictional force between the friction plates and the separator plates couples the components. The torque capacity of each shift element varies in proportion to changes in the fluid pressure. The pump 20, driven by the input shaft 10, draws fluid from a sump 22 and delivers the fluid at an elevated pressure to a valve body 24. The valve body 24 delivers the fluid to the clutch apply chambers at a pressure controlled in accordance with signals from a controller 26 which may also be referred to as a powertrain controller herein. In addition to the fluid provided to the clutch apply chambers, the valve body provides fluid for lubrication and provides fluid to the fluid coupling 12. The fluid eventually drains from the gearbox 16 back to the sump 22 at ambient pressure.

To reduce energy consumption, the internal combustion engine may be shut off when the vehicle is stopped, such as when waiting at a stop light. The engine is then restarted when a driver releases a brake pedal. To ensure that the powertrain is ready to transmit power as soon as the engine is started, it is desirable to maintain some shift elements in an engaged state while the engine is off. To accomplish that, pressurized fluid is allowed to flow into an accumulator 28 when the engine is running and then returned to the valve body 24 when the engine is off.

Figure 2:
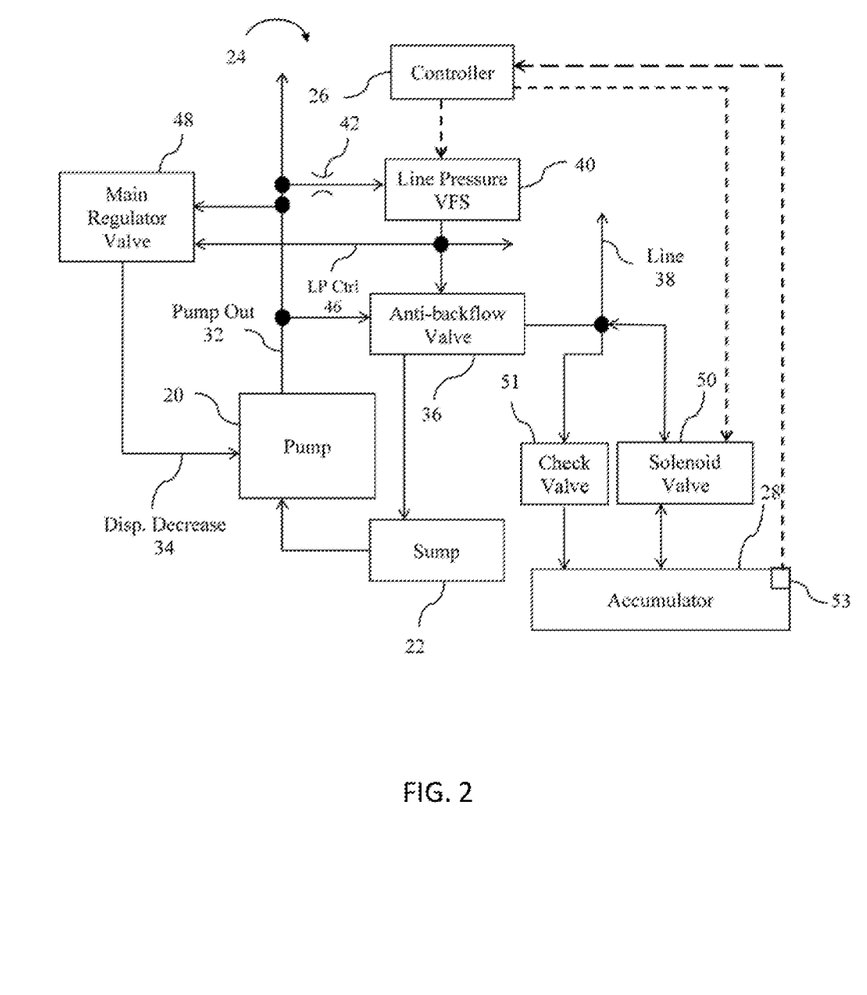
FIG. 2 is a schematic diagram illustrating an example of a fluid supply subsystem of a hydraulic control system for the transmission of FIG. 1.

FIG. 2 is a schematic diagram illustrating an example of a portion of the valve body 24 that constitutes a fluid supply subsystem. The pump 20, which is driven by the transmission input shaft, draws fluid from the sump 22 and delivers the fluid to a pump out circuit 32. The pump 20 may be a positive displacement pump. While disregarding leakage, positive displacement pumps deliver a certain amount of fluid per revolution of the pump shaft regardless of relative pressure at the pump inlet and pump outlet. The amount of fluid delivered per revolution is called a pump displacement. Displacement of the pump 20 varies within predefined limits based on a pressure in a displacement decrease circuit 34. Torque required to rotate the pump shaft increases as the pressure at the pump outlet increases relative to the pressure at the inlet and also increases in proportion to the pump displacement.

During normal operation, an anti-backflow valve 36 is open such that fluid flows freely from the pump out circuit 32 to the line pressure circuit 38 and such that the pressure in the two circuits is substantially equal. The controller 26 may adjust the pressure in these two circuits by sending a command to a line pressure Variable Force Solenoid (VFS)

40. Fluid flows from the pump out circuit 32, through an orifice 42, through a valve opening in line pressure VFS 40, and then into a line pressure control circuit (LP Ctrl circuit) 46. A pressure drop from the pump output circuit 32 to the LP Ctrl circuit 46 may vary based upon the size of the opening in line pressure VFS 40. The size of the opening in line pressure VFS 40 may vary based on movement of a spool. The controller 26 may direct electrical current to create a magnetic force on the spool tending to enlarge the opening. Fluid in the LP Ctrl circuit 46 acts on an area of the spool to create a force tending to reduce the size of the opening. An equilibrium may be reached at which the pressure in the LP Ctrl circuit 46 is proportional to the electrical current.

A main regulator valve 48 may adjust the displacement of the pump 20 in order to maintain the pressure in the pump out circuit 32 proportional to the pressure in the LP Ctrl circuit 46. Pressure in the LP Ctrl circuit 46 generates a force on a spool in a main regulator valve 48. Pressure in the pump out circuit 32 may generate a force on the spool valve in an opposite direction. When the pressure in the pump out circuit 32 exceeds the pressure in the LP Ctrl circuit 46, the spool moves to allow flow from the pump out circuit 32 to the displacement decrease circuit 34. Pressure in the displacement decrease circuit 34 may cause a reduction in the flow rate from the pump 20 into the pump out circuit 32. Components fed by the pump out circuit 32 and the line pressure circuit 38 may establish a relationship between the pressure in these circuits and the flow rate. Consequently, the reduction in flow rate results in a reduction in the pressure in the pump out circuit 32 until an equilibrium is reached.

When the vehicle is stopped, such as when waiting at a traffic light, the controller 26 may shut off the engine to conserve fuel. When the driver again demands torque by releasing the brake and pressing an accelerator pedal, the controller 26 may restart the engine. In order to respond quickly after the engine is restarted, it is important to maintain some clutches electrically commanded as 'on' but not hydraulically engaged. Fluid flow to maintain these clutch states is provided by the accumulator 28 which feeds a flow source, such as the line pressure circuit 38, via a solenoid valve 50. The solenoid valve 50 may include an orifice, such as a discharge orifice, and operates to fill fluid in the accumulator 28. However, when the engine is running and the pressure in the line pressure circuit 38 exceeds the pressure in the accumulator 28, the controller 26 may open the solenoid valve 50 to charge the accumulator 28 via the discharge orifice. In some embodiments, charging of the accumulator 28 may be accomplished passively by a check valve 51 in parallel with the solenoid valve 50. Fluid traveling through the check valve 51 flows at a much slower rate than fluid traveling through the solenoid valve 50. The check valve 51 may include a bleed orifice to passively fill the accumulator 28. The controller 26 may further include programming to identify a pressure level of the accumulator based on an identified flow rate of fluid as related to the check valve 51. It is contemplated that the solenoid valve 50 and the check valve 51 may be a single integrated unit. Optionally, the accumulator may include a sensor 53. The sensor 53 may be in communication with the controller 26 to provide information relating to the accumulator 28, such as a percentage fill level or a percentage pressure level.

During engine shutdown periods, the controller 26 may pressurize the line pressure circuit 38 by opening the solenoid valve 50. During these engine shutdown periods, the controller 26 may also set current to the line pressure VFS 40 to an intermediate level causing the pressure in LP Ctrl circuit 46 to be at an intermediate level. In response to this reduction in LP Ctrl pressure, the spool of the anti-backflow valve 36 may move to a position in which the line pressure circuit 38 is isolated from the pump out circuit 32, reducing the number of components that must be fed by the accumulator 28.

Figure 3:
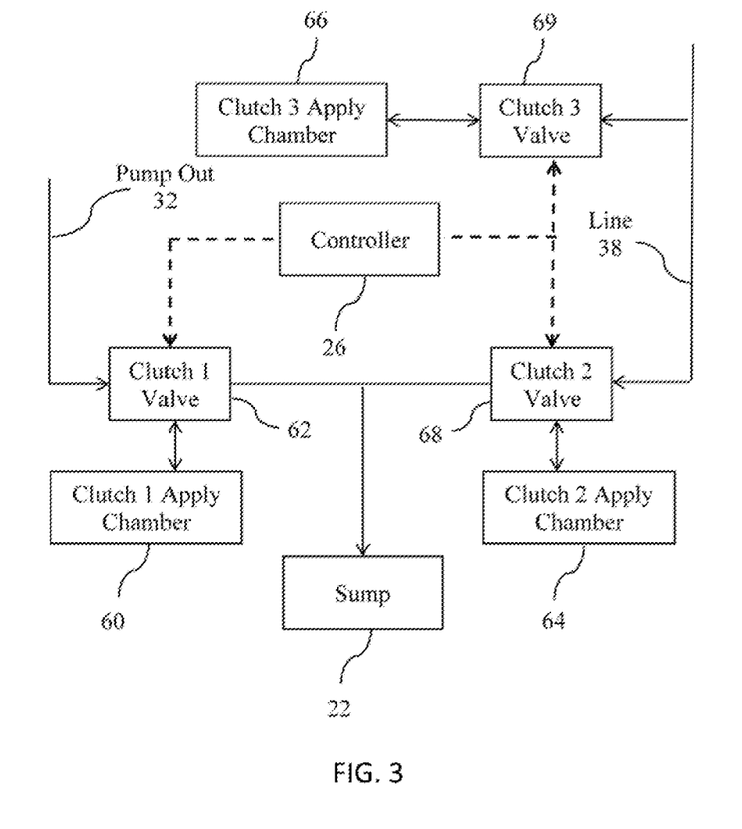
FIG. 3 is a schematic diagram illustrating an example of a portion of a shift element control subsystem of a hydraulic control system for the transmission of FIG. 1.

FIG. 3 is a schematic diagram illustrating a portion of a clutch control subsystem which may also be referred to as a clutch system herein. It is contemplated that the clutch system may have alternative configurations linking a flow source, such as the pump out circuit 32 or the line pressure circuit 38 to clutches of the clutch system. A clutch 1 apply chamber 60 of a first shift element is supplied from a flow source such as the pump out circuit 32 via a first clutch valve 62 which may be a VFS. As a result, the clutch 1 apply chamber 60 can only be applied when the engine is running. To engage the first shift element, the controller 26 commands the first clutch valve 62 to set the pressure of the clutch 1 apply chamber 60 to a value between zero and a pressure in the pump out circuit 32. The controller 26 may adjust the pressure by adjusting a current to a solenoid in the first clutch valve 62. When the current is set to zero, the first clutch valve 62 isolates the clutch 1 apply chamber 60 from the pump out circuit 32 and connects the clutch 1 apply chamber 60 to the sump 22 thereby allowing the fluid to escape to release the clutch.

Although a single valve is shown for simplicity, the system may include a latch valve or other supplemental valves. Similarly, a clutch 2 apply chamber 64 for a second shift element and a clutch 3 apply chamber 66 for a third shift element may be supplied from the line pressure circuit 38 via a second clutch valve 68 and a third clutch valve 69, respectively. Each of the second clutch valve 68 and the third clutch valve 69 may be VFS valves. As a result, shift elements of the clutch 2 apply chamber 64 and the clutch 3 apply chamber 66 may be applied even when the engine is not running. To engage the second shift element, the controller may command the second clutch valve 68 to set a pressure of the clutch 2 apply chamber 64 to a value between zero and the pressure in the line pressure circuit 38. The controller 26 may adjust the pressure by adjusting a current to a solenoid in the second clutch valve 68. When the current is set to zero, the second clutch valve 68 isolates the clutch 2 apply chamber 64 from the pump out circuit 32 and connects the clutch 2 apply chamber 64 to sump 22 thereby allowing the fluid to escape to release the clutch. Additional shift elements may be controlled similarly, some supplied by the line pressure circuit 38 and some supplied by the pump out circuit 32.

Figure 4:
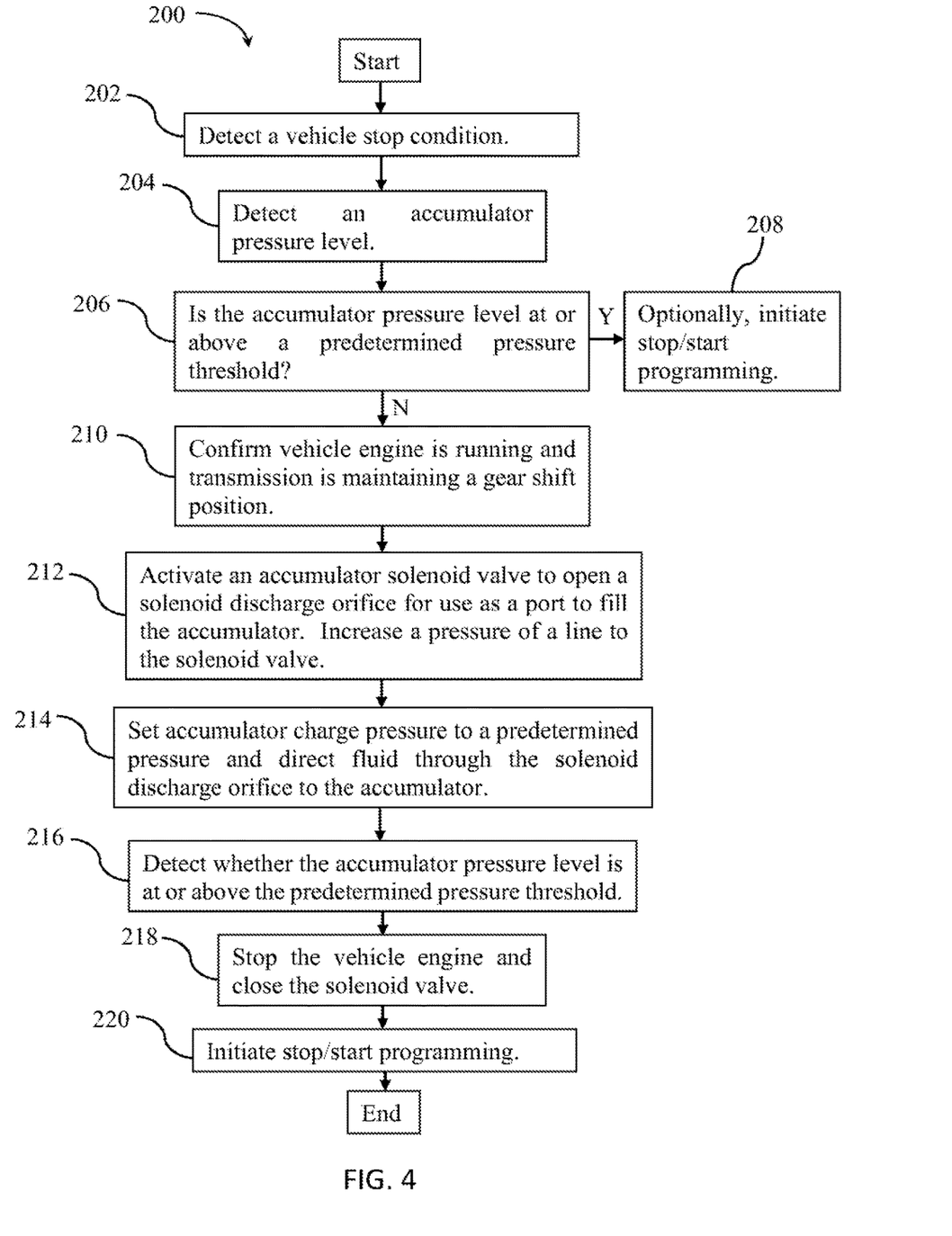
FIG. 4 is a flow chart illustrating an example of a control strategy for operation of a transmission assembly.

FIG. 4 is a flow chart illustrating an example of a control strategy for selectively and rapidly charging an accumulator of a vehicle transmission assembly to support activation of stop/start programming, referred to generally as a control strategy 200 herein. In operation 202 a controller, such as the controller 26, may operate with a vehicle system to identify whether a vehicle stop condition has occurred. One example of a vehicle stop condition is a vehicle stop at a traffic light.

In operation 204, the controller may identify a fluid pressure level of an accumulator, such as the accumulator 28. The fluid pressure level may be based on a percentage fill level of the accumulator relative to an accumulator fill level needed to facilitate stop/start programming. The controller may detect the fluid pressure level based on a detected flow rate of fluid through a check valve, such as the check valve 51, in fluid communication with the accumulator. Alternatively, the accumulator may include a sensor, such as the sensor 53, arranged with the accumulator to identify the fluid pressure level and send the fluid pressure level information to the controller.

In operation 206, the controller may identify whether the accumulator is filled to or above a predetermined pressure threshold. The predetermined pressure threshold may relate to a fill level corresponding to an amount of accumulator fluid needed to assist in operating the vehicle stop/start programming. In one example, the predetermined pressure threshold may be substantially equal to a pressure level between 700 kPa and 900 kPa.

In the event the accumulator pressure level is at or above the predetermined pressure threshold, the controller may optionally initiate the stop/start programming in operation 208. In the event the accumulator pressure level is below the predetermined pressure threshold, the controller may confirm that a vehicle engine is running and that the transmission is maintaining a gear shift position in operation 210.

In operation 212, the controller may activate an accumulator solenoid valve, such as the solenoid valve 50, and open a solenoid discharge orifice for use as a port for fluid to flow therethrough and into the accumulator. Additionally, the controller may command a pressure increase in a line supplying fluid to the solenoid discharge orifice.

In operation 214, the controller may set a charge pressure of the accumulator to a predetermined pressure and direct fluid through the solenoid discharge orifice to the accumulator. For example, the controller may set a pressure of a flow source, such as the pump out circuit 32 or the line pressure circuit 38, in fluid communication with the accumulator such that fluid travels through the solenoid discharge orifice. The controller may then detect whether the accumulator is at or above the predetermined pressure threshold in operation 216. The controller may be programmed to repeatedly check the accumulator pressure level at spaced apart time intervals as the accumulator fills with fluid.

In the event the controller detects that the accumulator is at or above the predetermined pressure threshold in operation 216, the controller may stop the engine and close the solenoid valve in operation 218 and initiate the stop/start programming in operation 220.

In another example, clutches of the clutch system may drain down and become empty once the engine or an impeller stops turning. This may lead to turbine speed flare and over firm clutch engagements during a restart operation of stop/start programming. To address these issues, the accumulator may be commanded to discharge immediately upon detection of a command to crank the engine during a restart operation of stop/start programming. The discharge from the accumulator may fill the line pressure circuit which in turn may fill the clutches of the clutch system in communication therewith.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission assembly comprising:
   a clutch system including a flow source;
   an accumulator selectively in communication with the flow source via a solenoid valve; and
   a controller programmed to,
      responsive to detection of a vehicle stop and the accumulator charged below a predetermined threshold, output a command to open the solenoid valve to charge the accumulator from the flow source, and
      responsive to detection of the accumulator being charged to or above the predetermined threshold, output a shut down command to an engine in communication with the transmission assembly and output a close command to the solenoid valve.

2. The assembly of claim 1, wherein the predetermined threshold is an accumulator pressure between 700 kPa and 900 kPa.

3. The assembly of claim 1, wherein the flow source is one of a pump out circuit or a line pressure circuit.

4. The assembly of claim 1 further comprising a check valve in fluid communication with the flow source and oriented in parallel to the solenoid valve, and wherein the cheek valve is arranged with the accumulator to passively allow fluid to travel therethrough and fill the accumulator.

5. The assembly of claim 4, wherein the check valve is further arranged with the accumulator to identify a flow rate of fluid traveling through the check valve, and wherein the controller is further programmed to identify a pressure level of the accumulator based on the identified flow rate.

6. The assembly of claim 1, wherein the controller is further programmed to output the command to open the solenoid valve to charge the accumulator responsive to detection of the clutch system maintaining a gear shift position during the vehicle stop.

7. A transmission assembly comprising:
   a clutch system including a line pressure circuit;
   an accumulator selectively in communication with the line pressure circuit via a solenoid valve configured to selectively open and close to discharge and fill the accumulator;
   a check valve in passive fluid communication with the line pressure circuit and arranged in parallel to the solenoid valve; and
   a controller programmed to, responsive to detection of a vehicle stop, the accumulator charged below a predetermined threshold, and a transmission maintaining a gear shift position, output a command to open the solenoid valve to charge the accumulator from the line pressure circuit, then output a command to increase a pressure within the line pressure circuit, and then output a command to close the solenoid valve upon detection of the accumulator being charged to the predetermined threshold.

8. The assembly of claim 7, wherein the controller is further programmed to output a command to shut down an engine after the solenoid valve is closed.

9. The assembly of claim 7, wherein the predetermined threshold is an accumulator pressure between 700 kPa and 900 kPa.

10. The assembly of claim 7, wherein the check valve is leather arranged with the accumulator to identify a flow rate of fluid traveling through the check valve, and wherein the controller is further programmed to identify a pressure level of the accumulator based on the identified flow rate.

11. The assembly of claim 7 further comprising a sensor in communication with the controller and arranged with the accumulator to identify a charge level of the accumulator.

12. The assembly of claim 7, wherein the transmission maintaining a gear shift position is reflective of vehicle conditions of the vehicle stop.

13. The assembly of claim 7, wherein the controller is further programmed to output a command to discharge the accumulator responsive to detection of a command to crank an engine during a restart operation of a stop/start program such that fluid from the accumulator fills the line pressure circuit and clutches of the clutch system.

14. A method of charging a transmission accumulator comprising:

responsive to detection of a vehicle stop condition and an accumulator pressure level below a predetermined pressure threshold, outputting, via a controller, an activation command to open a solenoid valve in fluid communication with an accumulator and a flow source, outputting, via the controller, a flow source pressure increase command such that fluid flows into the accumulator via the solenoid valve for filling at least to the predetermined pressure threshold, and operating a stop/start program; and orienting a check valve in fluid communication with the flow source in parallel to the solenoid valve.

15. The method of claim 14, wherein the predetermined pressure threshold is a pressure between 700 kPa and 900 kPa.

16. The method of claim 14 further comprising outputting a command, via the controller, to discharge the accumulator responsive to detection of a command to crank an engine during a restart operation of the stop/start program such that fluid from the accumulator fills the flow source and clutches of a clutch system.

17. The method of claim 14, wherein outputting the activation command is further responsive to detection of a transmission maintaining a gear shift position during the vehicle stop condition.

18. The method of claim 14, wherein the detecting whether the accumulator is at or above the predetermined pressure threshold further comprises one of (i) the controller identifying an accumulator pressure level based on a fluid flow rate of fluid traveling through the check valve, or (ii) the controller identifying the accumulator pressure level based on information received from a sensor of the accumulator.

* * * * *